(12) United States Patent
Waggoner et al.

(10) Patent No.: US 7,139,136 B2
(45) Date of Patent: Nov. 21, 2006

(54) HANDHELD ILLUMINATING MAGNIFIER

(75) Inventors: Juli H. Waggoner, Coppell, TX (US); Robert E. Waggoner, Jr., Coppell, TX (US)

(73) Assignee: Menu Mate, LLC, Coppell, TX (US)

( * ) Notice: Subject to any disclaimer, the term of this patent is extended or adjusted under 35 U.S.C. 154(b) by 0 days.

(21) Appl. No.: 11/083,911

(22) Filed: Mar. 18, 2005

(65) Prior Publication Data

US 2005/0213226 A1    Sep. 29, 2005

Related U.S. Application Data

(60) Provisional application No. 60/557,227, filed on Mar. 29, 2004.

(51) Int. Cl.
G02B 27/02    (2006.01)

(52) U.S. Cl. .................. 359/803; 359/798; 359/802

(58) Field of Classification Search ................ 359/803, 359/802, 798, 808, 811
See application file for complete search history.

(56) References Cited

U.S. PATENT DOCUMENTS

| | | | |
|---|---|---|---|
| 1,886,747 A | 11/1932 | Schroder | |
| 1,909,662 A | 5/1933 | Conners | |
| 2,384,528 A | 9/1945 | Brandt | |
| 2,586,723 A | 2/1952 | Sakols | |
| 3,500,034 A | 3/1970 | Bissell | |
| 4,577,927 A | 3/1986 | Raney | |
| 4,763,986 A | 8/1988 | Sego | |
| 4,765,701 A | 8/1988 | Cheslak | |
| 4,859,032 A | 8/1989 | Feinbloom | |
| 4,862,614 A | 9/1989 | Shettleroe | |
| 5,021,933 A | 6/1991 | Cordes | |
| 5,087,112 A | 2/1992 | Feinbloom | |
| 5,754,349 A | 5/1998 | Hon | |
| 5,937,681 A | 8/1999 | Myhr | |
| 6,538,828 B1 * | 3/2003 | Redmond | 359/800 |
| 2002/0108966 A1 * | 8/2002 | Park | 222/113 |
| 2004/0022065 A1 * | 2/2004 | Assinder et al. | 362/494 |
| 2004/0097833 A1 * | 5/2004 | Mueller et al. | 600/573 |
| 2005/0254233 A1 * | 11/2005 | Alessio | 362/169 |

* cited by examiner

Primary Examiner—Timothy Thompson
Assistant Examiner—Jerry Fang
(74) Attorney, Agent, or Firm—Haynes and Boone, LLP

(57) ABSTRACT

An illuminated magnifying device comprises an elongated magnifying lens, a light source, and an elongated light pipe disposed along the magnifying lens operable to receive light emitted from the light source and direct the light outwardly from the light pipe and distribute the light substantially evenly onto an object surface to be viewed

19 Claims, 2 Drawing Sheets

HANDHELD ILLUMINATING MAGNIFIER

RELATED PATENT APPLICATION

This patent application claims the benefit of U.S. Provisional Patent Application No. 60/557,227, filed on Mar. 29, 2004.

FIELD OF THE INVENTION

This invention relates to a magnifier, and more particularly, to a handheld illuminating magnifier.

BACKGROUND

The utility of illuminating magnifiers is widely recognized. Portable illuminating magnifiers provide convenient viewing in compromised reading environments, such as darkened theaters or dimly-lit restaurants. However, existing devices are bulky, uses point light sources that create glare, and are not convenient to use.

DESCRIPTION OF THE DRAWINGS

A more comprehensive understanding may be obtained by referring to the accompanying drawings in conjunction with the subsequent detailed description.

DETAILED DESCRIPTION

It is desirable to provide an illuminated magnifier device that does not distract or annoy those seated near or around the user. The light should only illuminate the intended object to be viewed. Because illumination by a point source light causes objectionable "hot spots" on the viewing surface, it is preferable that the light provides even illumination across the viewing area. Preferably, the light is capable of shining uniformly across the width of a restaurant menu or theatrical playbill, for example, The magnifier lens also preferably provides sufficient coverage of the illuminated viewing area. Therefore, the user does not need to continuously move the device over and across the surface of the object. Therefore, it is desirable to provide a device that optimizes and uniformly illuminates the viewing area, is discreet to use, and is compact, thin, and light-weight for easy storage and transportability. It is also desirable that the device be ergonomically styled to provide easy handling and activation of the light source.

Figure 1:
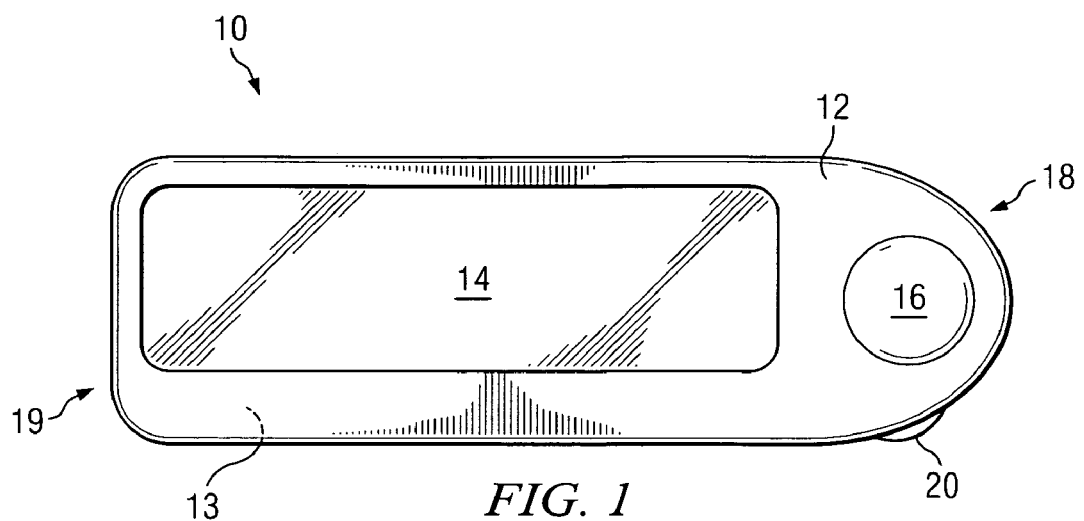
FIG. 1 is a front elevational view of an embodiment of the handheld illuminating magnifier.

FIG. 1 is a front elevational view of an embodiment of the handheld illuminating magnifier 10. Magnifier 10 has generally a slim profile with a front surface 12 and a rear surface 13. During use, the front side surface 12 is oriented generally toward the user, and the rear surface 13 is oriented generally toward the object to be viewed. Magnifier 10 comprises a magnifying lens 14 forming a substantially transparent window through the magnifier 10 that is operable to enlarge text, drawings, objects etc. held proximate the magnifying lens 14. The magnifying lens 14 is preferably a fresnel lens made of a suitable material. The focal length of the lens 14 is preferably chosen so that a user may hold it at a comfortable distance from the page and at a normal reading distance. The magnifier 10 preferably has an elongated body with a first end 18 and a second end 19. A switch 16 is mounted preferably at the first end 18 of the magnifier 10 for actuating a light source. The switch 16 may be a membrane switch or another type of suitable switch preferably with a smooth and flat profile that is easy to actuate. The switch 16 may comprise a screen printed flexible circuit with a tactile metal dome that provides positive tactile feedback when depressed. An optional thumb wheel potentiometer 20 or another suitable switch may be provided at the first end 18 for adjusting the light intensity emitted by the magnifier 10.

Figure 2:
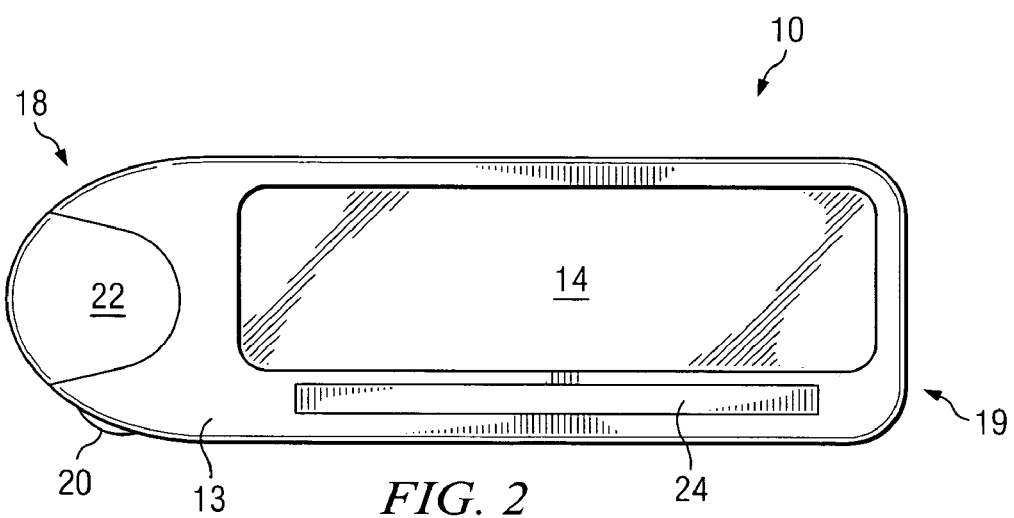
FIG. 2 is a back elevational view of an embodiment of the handheld illuminating magnifier.

FIG. 2 is a back elevational view of an embodiment of the handheld illuminating magnifier 10. A battery access door 22 may be disposed at the first end 18 of the magnifier to allow the user to refresh the battery. The battery access door 22 may be fastened by one or more suitable fasteners such as tabs, small screws, and the like. A multi-faceted side-emitting light pipe 24 is mounted and oriented longitudinally adjacent to the magnifying lens 14. The light pipe 24 is operable to conduct light injected into one end thereof, transmit the light down its entire length, and emit an uniform light substantially along its length in a general direction substantially away from the magnifier 10 and onto an object held in front of the magnifying lens 14. The construction of the light pipe 24 is described in more detail below in conjunction with references to FIG. 4. The light pipe 24 is mounted separated from the magnifying lens 14 and is not optically coupled thereto. The housing of the magnifier shields the light pipe 24 so that light is directed only in the general direction away from the magnifier 10. Stray rays of light from within the device is also shielded from the magnifying lens 14, thus preventing any objectionable glare to the user or bystanders.

Figure 3:
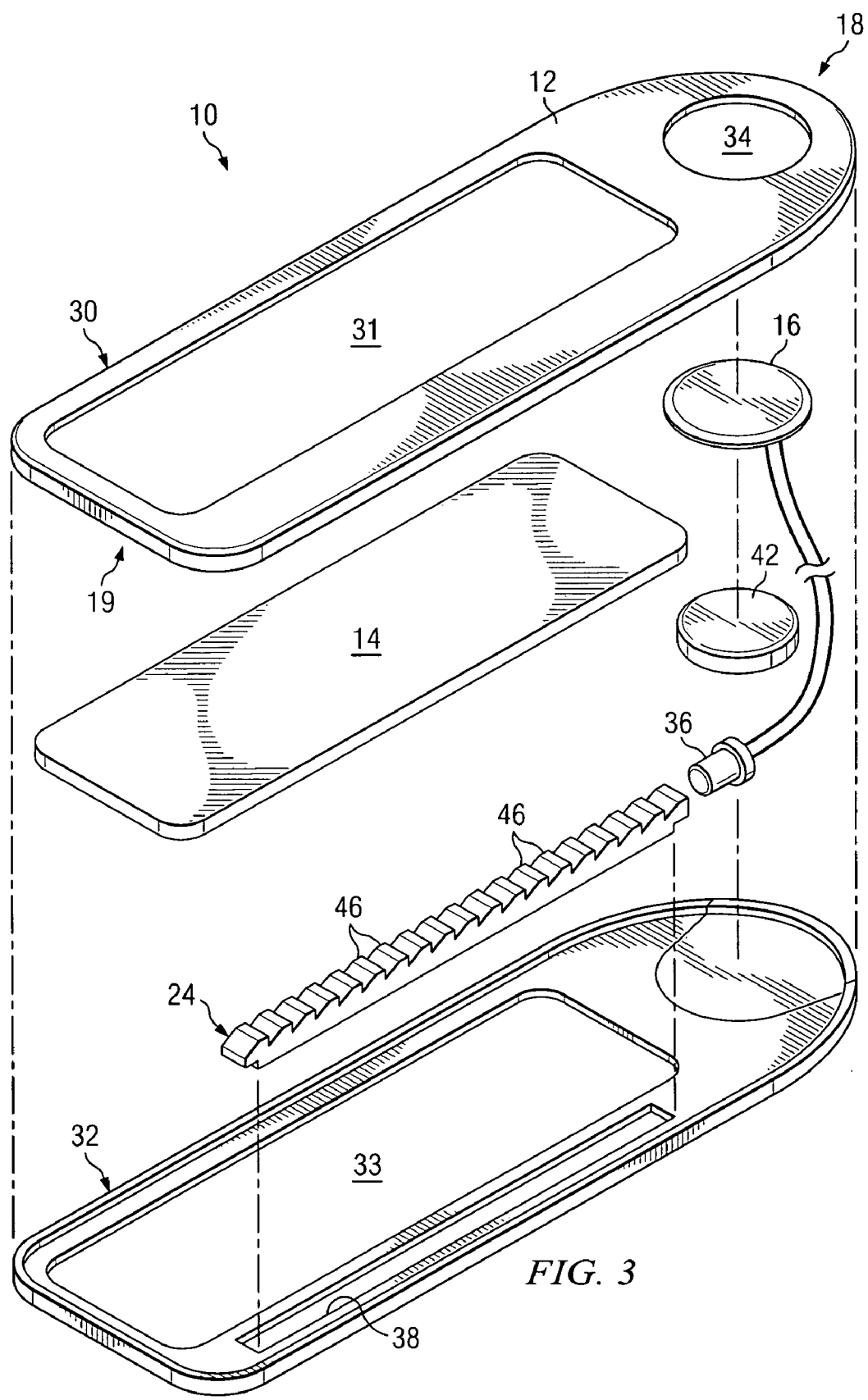
FIG. 3 is an exploded view of an embodiment of the handheld illuminating magnifier.

FIG. 3 is an exploded view of an embodiment of the handheld illuminating magnifier 10. Magnifier 10 has a housing with a top portion 30 and a bottom portion 32 that sandwiches the magnifying lens 14 between windows 31 and 33 formed in top and bottom housing portions 30 and 32. The magnifying lens 14 and windows 31 and 33 are preferably of sufficient length as to enable a user to easily scan and read across the width of a standard page size, such as 8½ inches, for example. Such a magnifier may have a lens length that ranges between 4 and 8 inches, for example. Alternatively, custom-made magnifiers may be made to accompany reading materials of non-standard sizes. For example, an upscale restaurant may issue to its clientele magnifiers custom made for its oversized menus. An opening 34 formed in the top housing portion 30 provides user access to the switch 16. The shape of the opening 34 preferably accommodates the actuating surface area of the switch 16. The switch 16 is electrically coupled to a light source 36 such as a light emitting diode (LED). Other forms of suitable light sources may also be used. The light source 36 is preferably disposed axially and adjacent to one end of the light pipe 24 and is operable to optimally inject light into the light pipe 24, which in turn transmits the light down its length and distributes the light evenly and outwardly from the magnifier 10. The light source 36 and the light pipe 24 form an illumination assembly actuated by the light switch 16. The bottom portion 32 of the housing further comprises an elongated opening 38 to expose the light pipe 24. However, the housing substantially encases the light source 36 and the faceted side of the light pipe 24 so that the only light that escapes the housing is through opening 38 via the light pipe 24. A power source 42 such as a battery is installed adjacent and electrically-coupled to the switch 16. A coin battery with a thin profile and small size may be used. The battery may be a disposable battery that may be replaced. The top surface of the switch 16 may be covered by a graphic label for trademark identification or aesthetic appeal. The entire assembly of the magnifier 10 is designed for light-weight portability and slim profile. Please note that in this view, the thumb wheel potentiometer 20 is not shown to avoid clutter and for the sake of clarity.

Figure 4:
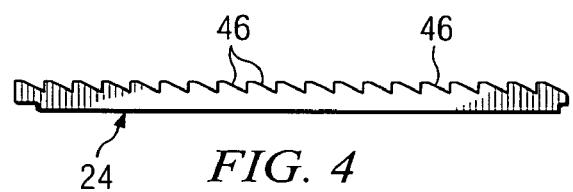
FIG. 4 is a side view of an embodiment of a light pipe used in the handheld illuminating magnifier.

FIG. 4 is a side view of an embodiment of an elongated light pipe 24 used in the handheld illuminating magnifier 10. The light pipe 24 is operable to conduct light injected into one end thereof, transmit the light down its entire length, and emit an uniform light substantially along its length in a general direction away from the magnifier 10 and onto an object held in front of the magnifying lens. The light pipe 24 may be constructed of an optically transmissive material with a refractive index greater than the refractive index of air, such as a suitable glass, acrylics, polystyrenes, and the like. The light pipe 24 may include a plurality of angled facets 46 disposed along its length generally equidistant from one another to reflect light out of the light pipe 24. The facets 46 are designed to have an angled surface to direct light outwardly from within the light pipe 24 and ensure uniform light distribution. The facets 46 themselves may further be faceted to further increase the output of light. It should be noted that the light pipe described herein is only an exemplary embodiment and that the magnifier 10 may employ other suitable fiber optics configurations and constructions for the transmission and distribution of light in the manner described herein.

While the preferred embodiments have been described and illustrated, various changes, alterations, modifications and substitutions may be made thereto without departing from the scope of the invention. Specific examples of materials, construction and dimensions have been provided herein, but the invention should not be so limited. The scope of the invention is governed by the accompanying claims below.

What is claimed is:

1. An illuminated magnifying device, comprising:
   an elongated magnifying lens;
   a light source; and
   an elongated light pipe disposed along the magnifying lens operable to receive light emitted from the light source and direct the light outwardly from the light pipe and distribute the light substantially evenly onto an object surface to be viewed, wherein the elongated light pipe comprises a plurality of facets disposed along its length substantially equidistant from one another.

2. The device of claim 1, further comprising a switch operable to turn on and off the light source.

3. The device of claim 1, further comprising a membrane switch operable to turn on and off the source.

4. The device of claim 1, wherein the light source comprises a light emitting diode.

5. The device of claim 1, further comprising a potentiometer thumb wheel operable to regulate the light intensity of the light source.

6. The device of claim 1, further comprising a battery supplying power to the light source.

7. The device of claim 1, further comprising a housing having a top portion and a bottom portion, the top and bottom portions each having an elongated window exposing the elongated magnifying glass.

8. The device of claim 7, wherein the housing bottom portion further comprises an elongated opening exposing the elongated light pipe.

9. The device of claim 8, wherein the housing encases and optically isolates the light pipe from the magnifying lens.

10. The device of claim 7, wherein the housing top portion further comprises an opening exposing a switch operable to turn on and off the light source.

11. The device of claim 7, wherein the housing further comprises a battery access door providing access to a battery supplying power to the light source.

12. The device of claim 1, wherein the magnifying lens comprises a fresnel lens.

13. The device of claim 1, wherein the elongated magnifying lens is optimally dimensioned to enable a user to substantially view across a page width without significant side-to-side movement of the device.

14. An illuminated magnifying device, comprising:
   an elongated magnifying lens;
   an illumination assembly disposed proximately to the magnifying lens operable to generate and distribute light evenly to form a generally elongated illuminated viewing area; and
   a switch operable to turn on and off the illumination assembly, wherein the illumination assembly comprises;
   a light source; and
   an elongated light pipe optically coupled to the light source to receive light therefrom, transmit the light down its length and distribute the light outwardly from the light pipe, wherein the elongated light pipe comprises a plurality of facets disposed along its length substantially equidistant from one another.

15. The device of claim 14, wherein the switch comprises a membrane switch.

16. The device of claim 14, wherein the light source comprises a light emitting diode.

17. The device of claim 14, further comprising a potentiometer thumb wheel operable to regulate the light intensity of the illumination assembly.

18. The device of claim 14, wherein the magnifying lens comprises a fresnel lens.

19. An illuminated magnifying device, comprising:
   an elongated magnifying lens;
   a light source;
   an elongated light pipe disposed alongside the magnifying lens, the light pipe operable to receive light emitted from the light source and direct the light outwardly and distribute the light substantially evenly onto an object surface to be viewed, wherein the elongated light pipe comprises a plurality of facets disposed along its length substantially equidistant from one another;
   a switch electrically coupled to the light source and operable to actuate the light soiree; and
   a housing encasing the elongated magnifying lens and optically isolating the magnifying lens from the light source and elongated light pipe, and permitting light to emit from the housing only via the elongated light pipe.

* * * * *